United States Patent
Viecelli

[11] 3,813,555
[45] May 28, 1974

[54] METHOD AND MEANS FOR PRODUCING COHERENT X-RAY AND GAMMA-RAY EMISSIONS

[75] Inventor: James A. Viecelli, Oakland, Calif.

[73] Assignee: The United States of America as represented by the United States Atomic Energy Commission, Washington, D.C.

[22] Filed: May 16, 1973

[21] Appl. No.: 360,983

[52] U.S. Cl. .............................. 250/493, 250/495
[51] Int. Cl. ........................................... H01j 35/00
[58] Field of Search ................. 250/493, 494, 495; 331/94.5

[56] References Cited
UNITED STATES PATENTS
3,388,314  6/1968  Gould ............................. 250/493
3,511,227  5/1970  Johnson ...................... 331/94.5 A OTHER PUBLICATIONS
Physics, Halliday et al., 1962, pp. 1,006–1,008.

"Producing a –Quan. Beam by the Compton Effect with Relativistic Electrons," Kulikoo et al., 1966, Prihory, Tek. Eksp.

"The Compton Effect on Relativistic Electrons and Possibility of Obtaining High Energy Beams," Arutyunian et al., 1963 Phy. Letters.

"Laser–Induced Compton Back–Scattered Photon Beam at the Cambridge Electron Accelerator" Saver et al., 1969, Particle Acc. Conf.

Primary Examiner—James W. Lawrence
Assistant Examiner—B. C. Anderson
Attorney, Agent, or Firm—John A. Horan; F. A. Robertson; L. E. Carnahan

[57] ABSTRACT

A method and apparatus for producing coherent x-ray and gamma-ray emissions by taking advantage of doppler shift phenomena and the relativistic effects of time dilation, wave vector angle compression, and length compression associated with an active optical lasing medium moving at a uniform velocity very nearly equal to the speed of light.

7 Claims, 2 Drawing Figures

METHOD AND MEANS FOR PRODUCING COHERENT X-RAY AND GAMMA-RAY EMISSIONS

BACKGROUND OF THE INVENTION

The invention described herein was made in the course of, or under, Contract No. W-7405-ENG-48, with the U.S. Atomic Energy Commission.

The highest coherent radiation (laser) frequencies which can be produced by presently known techniques and devices are in the ultraviolet frequency region. As is well known to those skilled in the art, coherent radiation frequencies extending into the x-ray and gamma-ray regions would be very useful in such fields as communications and laser fusion.

SUMMARY OF THE INVENTION

The present invention provides a method and apparatus for producing coherent x-ray and gamma-ray emissions, and involves: 1. generating an ion beam which can be induced into laser action to cause the emission of a beam of coherent radiation having a characteristic frequency; 2. accelerating the ion beam to a relativistic velocity with respect to a stationary reference point; and 3. inducing laser action in the accelerated ion beam, to thereby cause the emission of a beam of coherent radiation having a frequency much greater than the characteristic frequency when measured with respect to the stationary reference point.

With suitable values for the characteristic frequency and the relativistic velocity, beams of coherent radiation may be produced which have frequency values within the x-ray and gamma-ray range of the electromagnetic frequency spectrum.

It is therefore the principal object of the present invention to provide a method and means for producing coherent x-ray and gamma-ray emissions.

Other objects of the invention will become apparent from the following description and accompanying drawings.

DESCRIPTION OF THE INVENTION

Briefly, the invention is achieved by taking advantage of doppler shift phenomena and the relativistic effects of time dilation, wave vector angle compression, and length compression associated with an active optical lasing medium moving at a uniform velocity very nearly equal to the speed of light.

The ions of many elements and their compounds can form a gaseous medium which may be induced into laser action by an optical pumping beam to cause the emission of coherent radiation having a frequency value characteristic of the type of ion in the medium.

Figure 1:
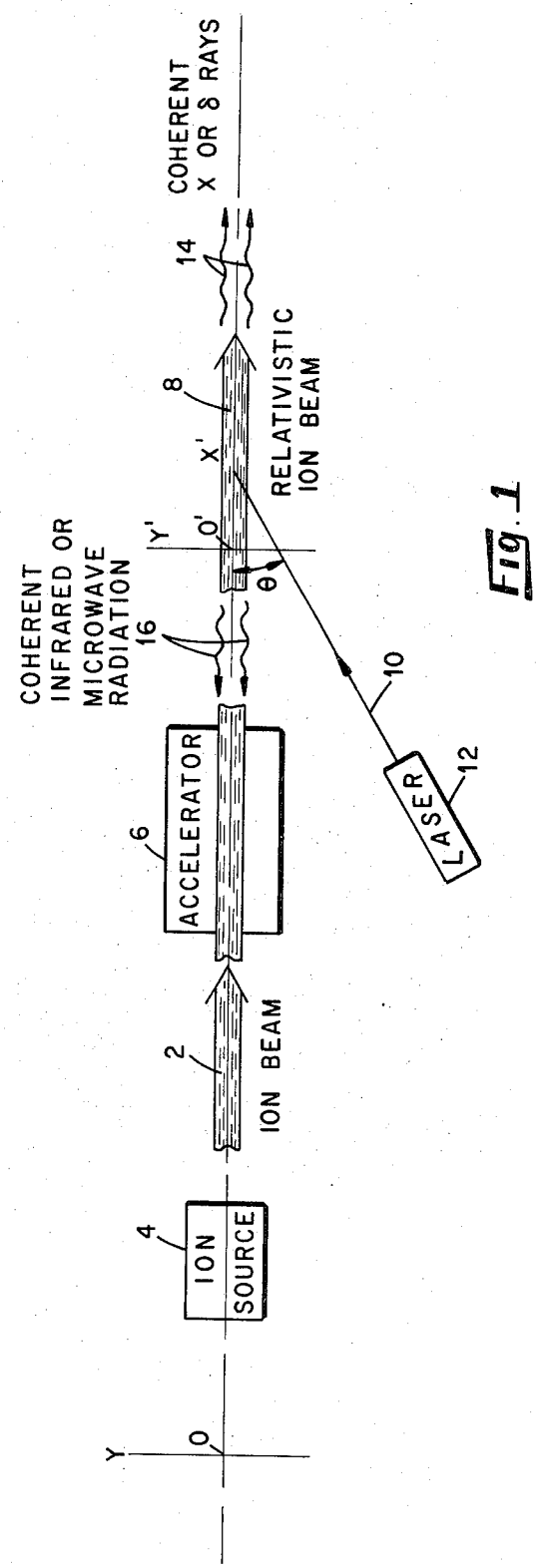
FIG. 1 schematically illustrates a basic embodiment of an apparatus in accordance with the invention.

In the basic embodiment of the invention, shown in FIG. 1, such a medium is generated in the form of an ion beam 2 by an ion source 4. The beam 2 as a whole is accelerated, such as by means of a superconductor microwave accelerator 6, to an ion beam 8 having a predetermined uniform velocity approaching the speed of light with respect to an observer $0$ at rest in a "laboratory" reference frame XY. An optical pumping beam 10 from a source 12, such as a conventional laser, is passed through the relativistic ion beam 8 at a predetermined angle $\Theta$ with respect to the reference frame XY such as to establish the necessary conditions for laser action, i.e., stimulated emission of coherent radiation, in the ion beam medium.

When laser action occurs, an observer $0'$ at rest in a reference frame $X'Y'$, moving with the relativistic ion beam 8, will detect two beams of coherent radiation 14 and 16 having the same frequency value $\nu'$ characteristic of the ionic beam material, beam 14 traveling in the same direction as the ion beam 8 (the "forward" direction) with beam 16 traveling opposite to the direction of ion beam 8 (the "backward" direction). To the observer $0$, however, the frequency of coherent beam 14 will be much greater than $\nu'$ and the frequency of coherent beam 16 will be much less than $\nu'$, due to doppler shift phenomena and relativistic effects.

As described in more detail below, it is this difference in the detected frequency of coherent beam 14 by observers $0$ and $0'$ which is used to achieve the production of coherent x-ray and gamma-ray emissions.

Assume that, relative to observer $0$, ion beam 8 has a velocity $V = (1 - \epsilon)c$, where $c$ is the speed of light, and $\epsilon << 1$. Then the transformation properties of the special theory of relativity for radiation in the XY and $X'Y'$ frames of reference show the following effects and results.

1. The frequency of the "forward" coherent beam 14, as detected by observer $0$, will be $$\nu = \sqrt{2/\epsilon}\,\nu'$$

As an example, let $\epsilon = 2 \times 10^{-6}$. Then $\nu = 1000\nu'$. Thus, to the observer $0$, the frequency of the emitted coherent radiation beam 14 is 1,000 times the characteristic frequency $\nu'$ of the lasing medium of the relativistic ion beam 8. If $\nu'$ is selected to be in the visible region of the spectrum, then $\nu$ will be in the x-ray frequency range. Similarly, still smaller values for $\epsilon$ will give values for $\nu$ in the gamma-ray frequency range.

2. The relationship between an angle $\theta'$ in the $X'Y'$ frame and the corresponding angle $\theta$ in the XY frame is highly nonlinear. Assume that observer $0'$ measures the angular spread of the "forward" coherent beam 14 as $\delta\theta'$. The observer $0$ will measure the angular spread as:

$$\Delta\theta = \sqrt{\epsilon/2}\,\delta\theta'$$

As an example, let $\epsilon = 2 \times 10^{-6}$. Then $\Delta\theta = 0.001\,\delta\theta'$. Thus, the "forward" coherent beam 14 is much more directional to observer $0$ than to observer $0'$.

3. The relationships between angles and between frequency and angles show that for a suitable choice of the incident angle $\theta$ of the optical pumping beam 10, it is possible to have the frequency of the optical beam 10 appear the same to both observer $0$ and $0'$. For example, for $\epsilon = 2 \times 10^{-6}$, the frequency of the optical pumping beam is the same to both observer $0$ and $0'$ if the angle of incidence $\theta$ is 3°37'. Thus, from the point of view of observer $0$, the optical pumping beam 10 must be aimed nearly parallel to the ion beam direction. However, to the observer $0'$, the optical pumping beam 10 would appear to be coming from almost dead ahead, i.e., with an angle of incidence $\theta$ of 176°23'. As an alternative, the angle of incidence of the optical pumping beam 10 can be adjusted such that the frequency of beam 10 as detected by observer 0' is greater than the frequency of beam 10 as detected by observer 0. Thus, by suitable choice of the angle of incidence of beam 10, the relativistic ion beam medium can be excited at x-ray or ultraviolet frequencies in the X'Y' frame using visible light frequencies in the XY frame.

4. Assume that observer 0' determined that an ion density $n_o'$ is required in the ion beam 8 to get gain. Then to observer 0 the corresponding ion density $n_o$ will be much greater, i.e.:

$$n_o = 1/\sqrt{2\epsilon}\, n_o'$$

In summary, observer 0', traveling with the relativistic ion beam 8, will detect equal amounts of coherent radiation emitted in the "forward" and "backward" direction (beams 14 and 16). With suitable choices for $\epsilon$ and $\nu'$, observer 0, at rest in the laboratory frame, will detect coherent x-rays or gamma-rays (beam 14) traveling in the "forward" direction, and coherent infrared or microwave radiation (beam 16) traveling in the "backward" direction. However, because of the relationship between angles in the frames XY and X'Y', the divergence of coherent beam 16 is much greater than that of beam 14.

Although the number of photons emitted in the forward and backward directions is the same relative to observer 0, almost all of the energy and momentum of the generated coherent radiation will come out in the forward direction because of the large difference in frequency between beams 14 and 16. The energy for the x-ray or gamma-ray beam 14 comes from the directed kinetic energy of the relativistic ion beam 8.

By way of example only, to illustrate the invention, the ion beam 2 is generated by ion source 4 from material, for example, such as: argon (Ar), krypton (Kr), xenon (Xe), neon (Ne), mercury (Hg), oxygen (O), boron (B), carbon (C), and cadmium (Cd). Laser oscillations or amplification has been obtained in the visible or near ultraviolet for the ions of these materials and many others. High power outputs have been obtained at 5,145 A and 4,880 A in Ar II and at 4,416 A and 3,250 A in Cd II. Using cadmium with a value $\epsilon = 2 \times 10^{-6}$ (example discussed earlier) the wavelength of beam 14 would be 4.416 A for the 4416 A transition and 3.250 A for the 3250 A transition. The corresponding wavelengths for beam 16 would be 0.4416 millimeters and 0.3250 millimeters. To pump the Cd II laser levels frequencies of 74,894 cm$^{-1}$ and 69,259 cm$^{-1}$ are required in the beam frame. If a ruby laser is used as the pump (6940 A) then the required angles in the lab frame ($\theta$) are 8° 16' and 7° 57'. Other kinds of lasers such as Nd:YAG or $CO_2$ can also be used for the pump, but then the angle ($\theta$) must be altered so that one still obtains 74,894 cm$^{-1}$ or 69,259 cm$^{-1}$ for the pump frequency in the beam frame (for the Cd II example). The formula for the angle $\theta$ is $\nu$ (pump frequency in beam frame)/$\nu\nu$ (pump frequency in lab frame) $\sqrt{1-(V^2/C} = 1 - v/C \cos\theta$ $v$ = Beam velocity
$C$ = velocity of light.

The system can operate without feedback, in which case beam 14 is produced by amplification and gain narrowing of spontaneous emission in the direction of the beam. Alternatively, feedback can be provided so that the device acts as an oscillator. Feedback can be distributed throughout the beam 8 by spatially modulating the number density of the ions as they pass through the accelerator 6. If $L$ is the period of the spatial modulation then the wavelength of oscillation in the beam frame is approximately 2L. For the Cd II example one would need L=2,208 A or 1,625 A, (in the beam frame).

It should be noted that no existing heavy ion accelerators are capable of approaching the energies required for $\epsilon \ll 1$, but perhaps in the future they will be. The ion velocities that can be obtained with existing machines are only a small fraction of the speed of light. The principle of the invention still applies, but the frequency shifts obtained are small.

The highest energy achieved so far is 30 Mev with He ions. There are development efforts contemplating energies in the 1,000 Mev range. These are based on the collective acceleration of ions and electrons. With the cadmium example at 1,000 Mev the doppler shift would only be 14 percent corresponding to wavelengths of 3,870 A and 2,840 A for beam 14.

Figure 2:
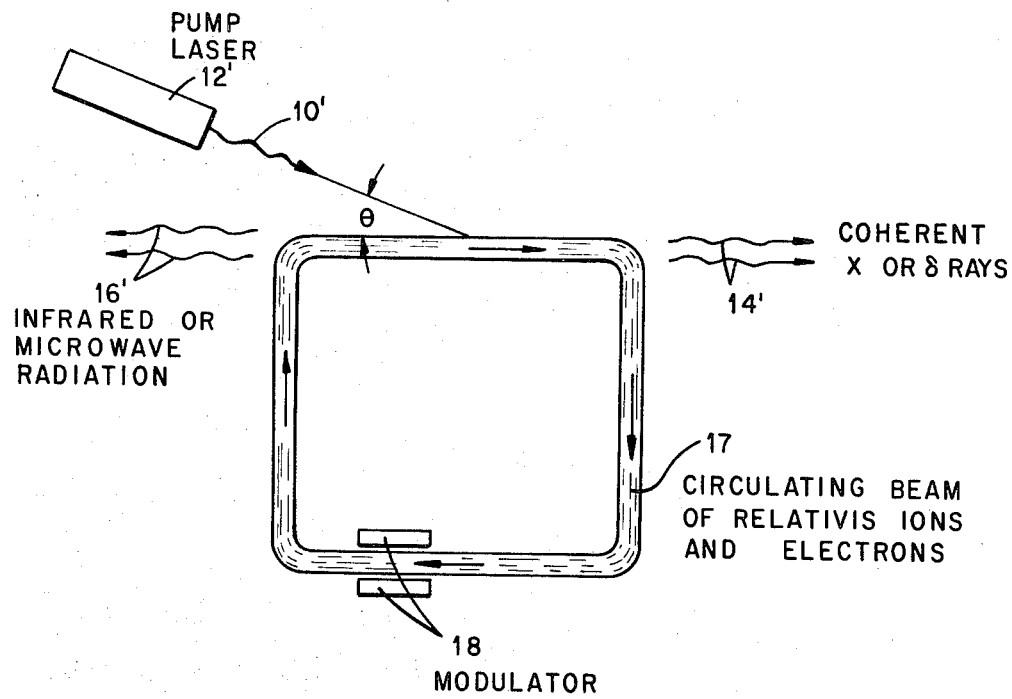
FIG. 2 schematically illustrates an embodiment of the invention utilizing a circulating beam.

FIG. 2 illustrates an embodiment of the invention utilizing a circulating beam of relativistic ions and electrons from an ion source passed through an accelerator (not shown but similar to that of FIG. 1), the beam being bent or deflected by beam deflecting apparatus not shown but which, for example, may be electromagnetic mechanism known in the art. Like components of the FIG. 1 embodiment will be given like reference numerals. As shown, a circulating beam of relativistic ions and electrons indicated at 17 pass through a modulator 18 which spatially modulates the density of the ions at a wavelength (in the beam frame) equal to ½ the wavelength of the laser transition of the ions. As the beam 17 circulates an optical pumping beam 10' from a source such as laser 12' is passed through the ion beam 17 at a predetermined angle $\theta$ with respect to the reference frame XY as in the FIG. 1 embodiment, whereby two beams of coherent radiation 14' and 16' travelling in opposite directions are detected as described above with respect to FIG. 1.

The method and apparatus of the invention described above attempt to avoid the apparently fundamental high frequency limit on laser operation imposed by the Einstein relationship between the spontaneous emission and stimulated emission coefficients ($A \alpha \nu^3 B$). This is accomplished by arranging for the laser action to take place in a coordinate frame (X'Y') where the spontaneous/stimulated ratio (A/B) is favorable, while having the emitted coherent radiation, the optical pumping beam, and the energy supply (the ion accelerator) in a different coordinate frame (XY).

It has thus been shown that the present invention provides a method and apparatus which involves:

1. Generating an ion beam which can be induced into laser action to cause the emission of a beam of coherent radiation having a characteristic frequency.

2. Accelerating the ion beam to a relativistic velocity with respect to a stationary reference point.

3. Inducing laser action in the accelerated ion beam, to thereby cause the emission of a beam of coherent radiation having a frequency much greater than the characteristic frequency when measured with respect to the stationary reference point.

Thus, with suitable values for the characteristic frequency and the relativistic velocity, beams of coherent radiation may be produced which have frequency values within the x-ray and gamma-ray range of the electromagnetic frequency spectrum.

While a particular embodiment for carrying out the method and particular examples have been illustrated and described, modifications and changes will become apparent to those skilled in this art, and it is intended to cover in the appended claims all such modifications and changes as come within the spirit and scope of the invention.

What I claim is:

1. A method for producing coherent x-ray and gamma-ray emissions comprising the steps of: generating an ion beam which can be induced into laser action to cause the emission of a beam of coherent radiation having a characteristic frequency; accelerating the ion beam to a relativistic velocity with respect to a stationary reference point; and inducing laser action in the accelerated ion beam by directing an optical pumping beam through the accelerated ion beam at an angle $\theta$ with respect to a fixed reference frame, said angle $\theta$ being defined by the formula: $\nu$ (pump frequency in beam frame)/$\nu$ (pump frequency in lab frame) $\times \sqrt{1 - V^2/C} = 1 - V/C \cos\theta$ where $V =$ beam velocity and $C =$ velocity of light causing the emission of a beam of coherent radiation having a frequency greater than the characteristic frequency when measured with respect to the stationary reference point.

2. The method defined in claim 1, wherein said step of accelerating the ion beam is accomplished by directing the beam through a superconductor microwave accelerator.

3. The method defined in claim 1, wherein said step of directing an optical pumping beam through the accelerated ion beam is carried out by passing a laser beam through the ion beam at an angle $\theta$ with respect to a fixed reference frame, said angle $\theta$ being defined by the formula: $\nu$ (pump frequency in beam frame)/$\nu$ (pump frequency in lab frame) $\sqrt{1 - v^2/C} = 1 - v/C \cos\theta$ where $v =$ beam velocity and $C =$ velocity of light.

4. An apparatus for producing coherent x-ray and gamma-ray emissions comprising: means for producing an ion beam of medium capable of being induced into laser action; means for accelerating the ion beam to a uniform velocity approaching the speed of light with respect to a stationary reference frame, means for inducing laser action in the accelerated ion beam, thereby causing emission of a beam of coherent radiation having a frequency greater than the characteristic frequency of the ion beam material when measured with respect to the stationary reference frame, said laser action inducing means comprising means for producing an optical pump beam and directing same through the accelerated ion beam at an angle $\theta$ with respect to the stationary reference frame, said angle $\theta$ being defined by the formula: $\nu$ (pump frequency in beam frame)/$\nu$ (pump frequency in lab frame) $\sqrt{1 - v^2/C} = 1 - v/C \cos\theta$ where $v =$ beam velocity and $C =$ velocity of light.

5. The apparatus defined in claim 4, wherein said medium is selected from the group consisting of argon, krypton, xenon, neon, mercury, oxygen, boron, carbon, and cadmium.

6. The apparatus defined in claim 4, wherein said accelerating means comprises a superconductor microwave accelerator.

7. The apparatus defined in claim 4, wherein said optical pumping beam producing means comprises a laser.

* * * * *